United States Patent

Tuttle et al.

[11] Patent Number: 5,432,027
[45] Date of Patent: Jul. 11, 1995

[54] BUTTON-TYPE BATTERY HAVING BENDABLE CONSTRUCTION, AND ANGLED BUTTON-TYPE BATTERY

[75] Inventors: Mark E. Tuttle; Peter M. Blonsky, both of Boise, Id.

[73] Assignee: Micron Communications, Inc., Boise, Id.

[21] Appl. No.: 205,957

[22] Filed: Mar. 2, 1994

[51] Int. Cl.⁶ .................................................. H01M 2/02
[52] U.S. Cl. ........................................ 429/127; 429/174
[58] Field of Search ................ 429/127, 174, 175, 176

[56] References Cited

U.S. PATENT DOCUMENTS

| | | | |
|---|---|---|---|
| 2,422,045 | 6/1947 | Ruben | 136/167 |
| 2,712,565 | 7/1955 | Williams, Jr. | 136/107 |
| 2,951,891 | 9/1960 | Kempf | 136/169 |
| 3,023,259 | 2/1962 | Color et al. | 429/127 |
| 3,096,217 | 7/1963 | Clune | 136/107 |
| 3,185,595 | 5/1965 | Schenk, Jr. | 136/133 |
| 3,440,110 | 4/1969 | Arbter | 136/166 |
| 3,457,117 | 7/1969 | Angelovich | 136/133 |
| 3,663,000 | 6/1972 | Ruetschi | 136/107 |
| 3,708,343 | 1/1973 | Walsh | 136/133 |
| 3,713,896 | 1/1973 | Feldhake | 136/133 |
| 3,799,959 | 3/1974 | Epstein | 260/429 |
| 3,891,462 | 6/1975 | Langkau | 136/111 |
| 3,935,026 | 1/1976 | Howard | 136/20 |
| 4,048,405 | 9/1977 | Megahed | 429/206 |
| 4,121,020 | 10/1978 | Epstein et al. | 429/174 |
| 4,122,241 | 10/1978 | Ciliberti, Jr. et al. | 429/133 |
| 4,263,380 | 4/1981 | Riedl | 429/162 |
| 4,374,909 | 2/1983 | Tucholski | 429/174 |
| 4,501,805 | 2/1985 | Yasuda et al. | 429/174 |
| 4,632,887 | 12/1986 | Jung | 429/181 |
| 5,326,652 | 7/1994 | Lake | 429/127 |

FOREIGN PATENT DOCUMENTS

| | | | |
|---|---|---|---|
| 1099018 | 11/1959 | Germany | 10/1 |
| 2201811 | 1/1972 | Germany | 21/84 |

*Primary Examiner*—Stephen Kalafut
*Attorney, Agent, or Firm*—Wells, St. John, Roberts, Gregory & Matkin

[57] ABSTRACT

A button-type battery has an anode, a cathode, a separator, and an electrolyte encased within a housing and surrounding by a fluid-tight peripheral seal. The battery is capable of being deflected such that a first portion of the battery is angled relative to a second portion through an internal angle between the first and second portions in a range from 175° to at least 90° without destroying operation of the button-type battery or rupturing the fluid-tight peripheral seal.

21 Claims, 5 Drawing Sheets

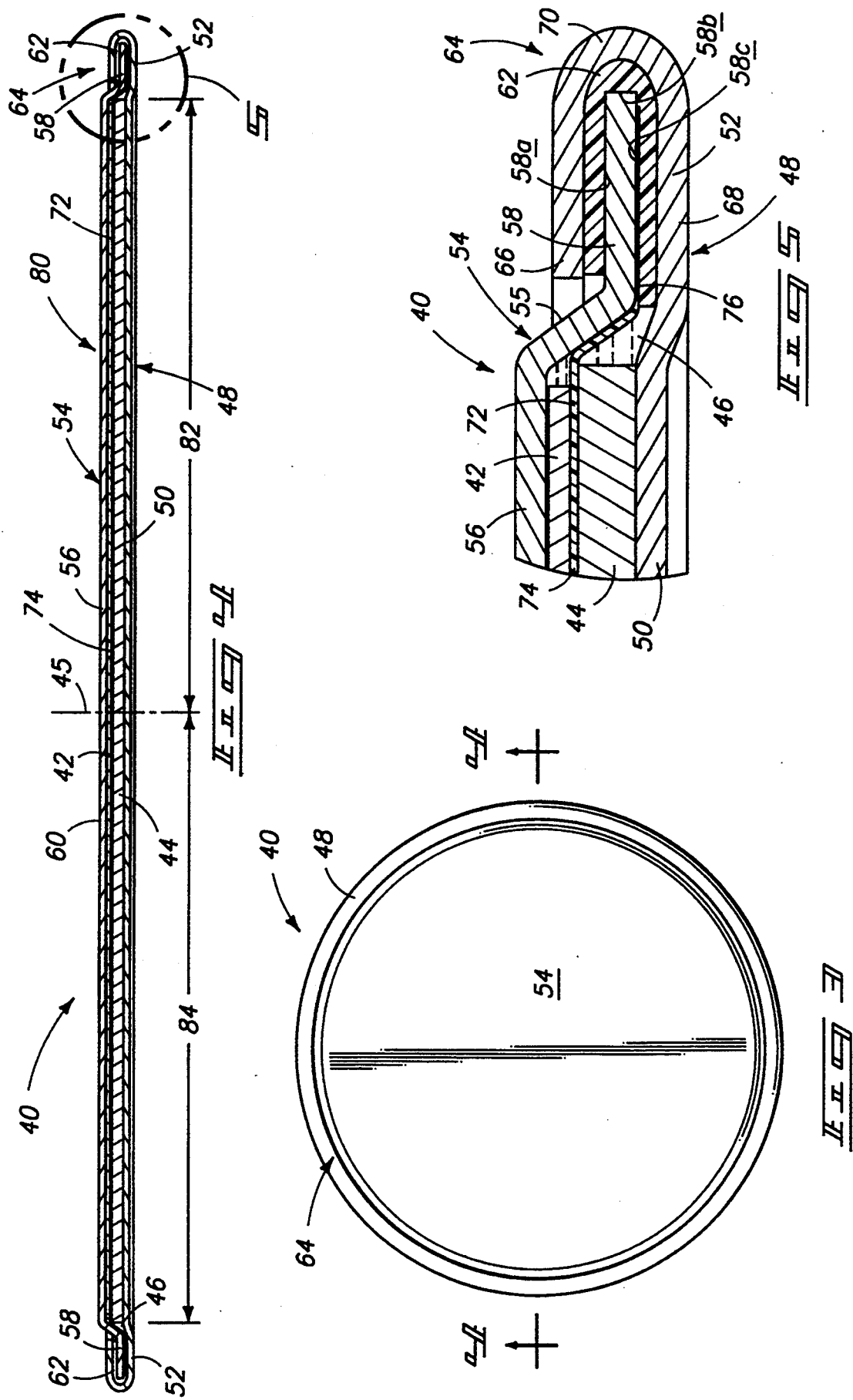

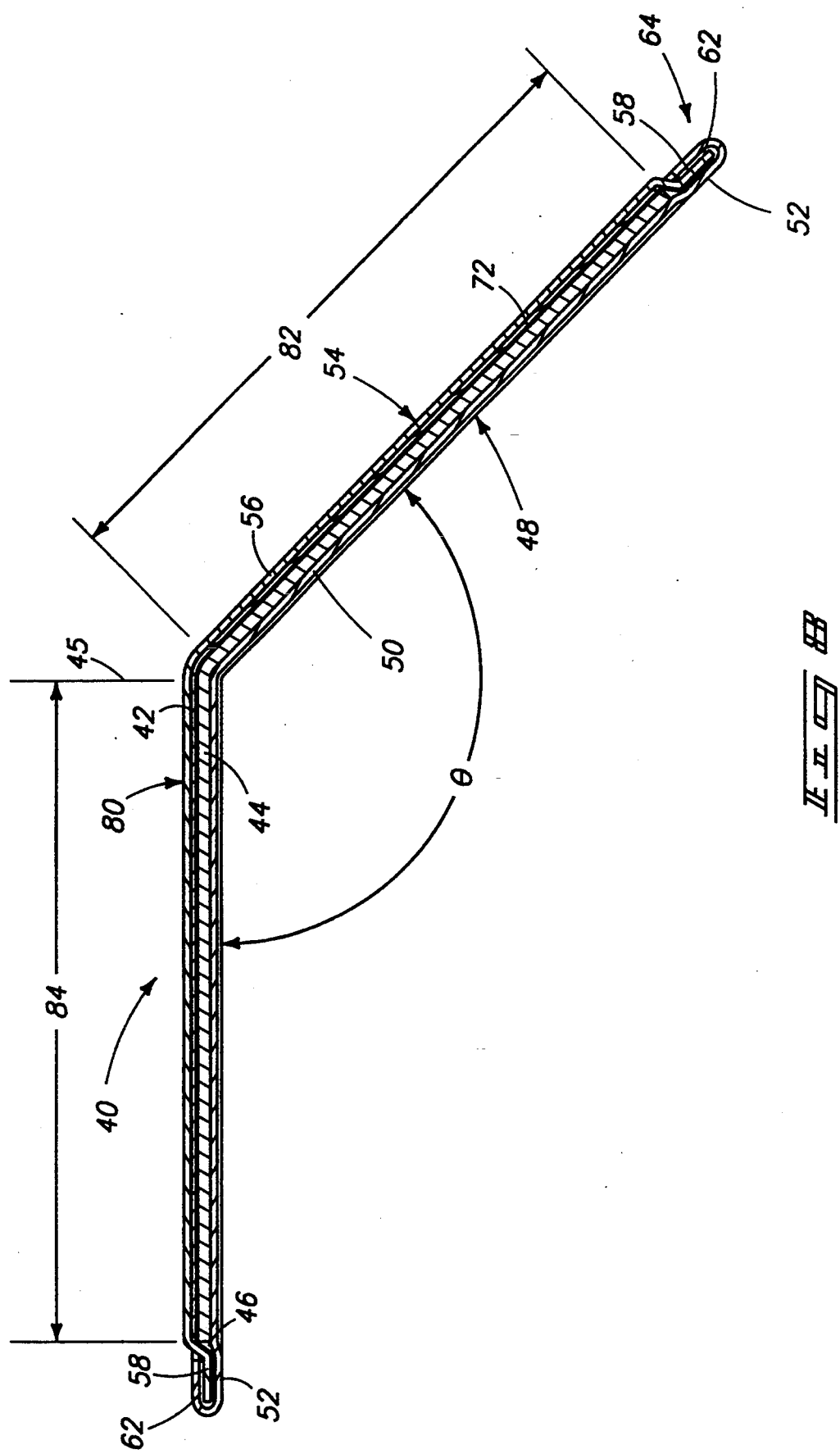

BUTTON-TYPE BATTERY HAVING BENDABLE CONSTRUCTION, AND ANGLED BUTTON-TYPE BATTERY

TECHNICAL FIELD

This invention relates to button-type batteries.

BACKGROUND OF THE INVENTION

Button-type batteries are small thin energy cells that are commonly used in watches and other electronic devices requiring a thin profile. FIGS. 1 and 2 show a conventional button-type battery 20. Battery 20 includes an anode 22, a cathode 24, a porous separator 26 separating the anode and cathode, and an electrolyte 28 which facilitates ion conductivity between the anode and cathode.

These internal battery components are housed within a metal casing formed by a lower conductive can 30 and an upper conductive lid 32. Can 30 electrically contacts cathode 24 and thereby forms the positive battery terminal. Lid 32 electrically contacts anode 22 to form the negative battery terminal. The can and lid are crimped or pressed together to form a fluid-tight seal 34 which entirely encloses the anode, cathode, separator, and electrolyte. An insulating gasket 36 is provided within primary seal 34 between lid 32 and can 30 to electrically insulate the two housing members.

There is a need in button-type battery usage to make such energy cells thinner. Today, the thinnest commercially available button-type battery has a thickness of 1.2 mm (47.2 mils). It would be desirable to make a thinner battery, particularly one having a thickness of less than 1 mm (39.4 mils). A countering concern, however, is that the integrity of the fluid-tight seal cannot be compromised simply to achieve the goal of thinner batteries.

Accordingly, it is desirable to design a button-type battery with a very thin profile, yet without degrading the integrity of the fluid-tight seal.

There is an evolving market for button-type batteries in personal carrying cards which employ such batteries. For example, smart cards, battery-back RAMs (Random Access Memories), and some credit cards are being manufactured with integrated circuitry and memory components that require a power source. It is desirable to form such integrated circuit cards as thin as standard magnetic-stripe credit cards which are widely used today. Credit cards have a nominal thickness requirement of approximately 30 mils (0.762 mm). A thin button-type battery of less than 30 mils (0.762 mm) thickness would be ideal for use in such integrated circuit carrying cards. However, conventional button-type batteries are too thick, inflexible and their seals easily rupture when bent. Once the fluid-tight seal ruptures, the electrolyte leaks from the battery, rendering the battery inoperable.

It would therefore be desirable to design a thin button-type battery with a thickness of less than 30 mils (0.762 mm), yet having high integrity seals that could be flexed and bent without destroying operation of the battery or rupturing the seal.

BRIEF DESCRIPTION OF THE DRAWINGS

Preferred embodiments of the invention are described below with reference to the following accompanying drawings. The same components and features illustrated throughout the drawings are referenced with like numerals.

FIG. 3 is a top view of a button-type battery according to this invention.

FIG. 4 is a cross-sectional view taken along line 4—4 in FIG. 3 of the button-type battery.

FIG. 5 is an enlarged cross-sectional view taken within circle 5 of FIG. 4 and shows a C-shaped fluid-tight crimp seal according to this invention.

FIG. 8 is a cross-sectional view similar to that taken along line 4—4 in FIG. 3, but showing the angled battery of FIG. 6.

DETAILED DESCRIPTION OF THE PREFERRED EMBODIMENTS

Figure 1:
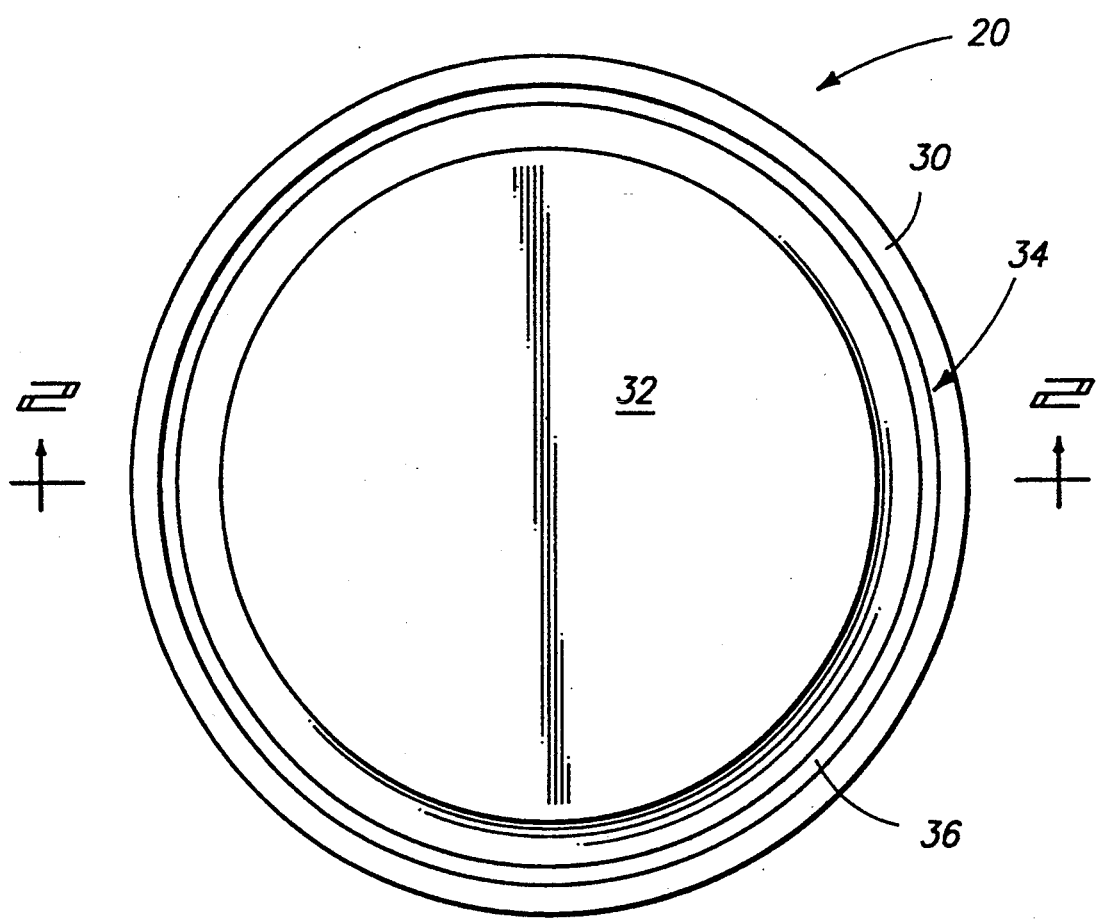
FIG. 1 is a top view of a prior art button-type battery.
Figure 2:
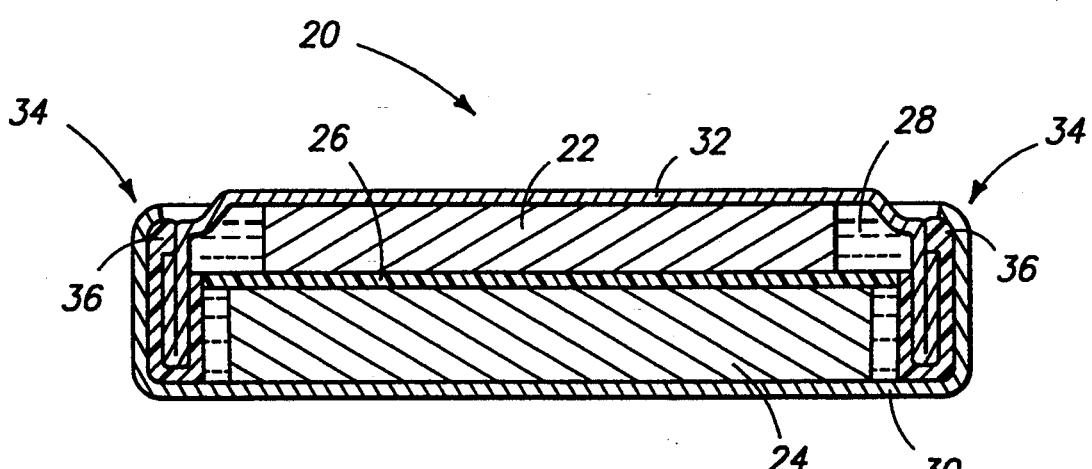
FIG. 2 is a cross-sectional view taken along line 2—2 in FIG. 1 of the prior art button-type battery.

This disclosure of the invention is submitted in furtherance of the constitutional purposes of the U.S. Patent Laws "to promote the progress of science and useful arts" (Article 1, Section 8).

This invention concerns "coin" or "button-type" batteries. A button-type battery is typically a small circular-shaped energy cell approximately the size of a coin. The button-type battery can be constructed in different sizes, with typical diameters being 12 mm, 16 mm, and 20 mm. Other shapes are possible, but the circular shape is most common.

According to one aspect of this invention, a button-type battery comprises:

an integral button-type energy cell unit having an anode, a cathode, a separator, and an electrolyte encased within a housing, the housing having a fluid-tight peripheral seal; and the integral button-type energy cell unit having first and second portions intermediate of the peripheral seal, the first portion being deflectable relative to the second portion through an internal angle between the first and second portions in a range from 175° to at least 90° without destroying operation of the button-type battery or rupturing the fluid-tight peripheral seal.

According to another aspect of this invention, a button-type battery comprises:

an anode aligned along a transverse central axis;

a cathode positioned adjacent to the anode and aligned along the transverse central axis;

a separator between and separating the anode and the cathode;

an electrolyte between the anode and the cathode;

a conductive first terminal housing member in electrical contact with one of the anode or the cathode; the first terminal housing member having a periphery;

a conductive second terminal housing member in electrical contact with the other of the anode or the cathode; the second terminal housing member having a periphery projecting substantially radially outward from the central axis;

the first and second terminal housing members forming an enclosed housing which holds and protects the anode and the cathode;

an insulating gasket between the first and second terminal housing member peripheries to electrically insulate the first terminal housing member from the second terminal housing member;

the first terminal housing member periphery and the insulating gasket wrapping around three sides of the second terminal housing member periphery to form a fluid-tight peripheral crimp seal which fluidically seals the anode and the cathode within the housing formed by the first and second terminal housing members, the first terminal housing member periphery having two segments on opposing sides of the second terminal housing member periphery and a continuously bending segment on a third side of the second terminal housing member periphery connecting the two segments; and the anode, the cathode, the separator, and the first and second terminal housing members having an effective total combined thickness and the peripheral crimp seal having an effective seal integrity to permit flexibility of the button-type battery where one portion of the button-type battery intermediate of the peripheral crimp seal can be deflected relative to another portion of the button-type battery intermediate of the peripheral crimp seal through an internal angle between the two portions in a range of 175° to at least 90° without destroying operation of the button-type battery or rupturing the fluid-tight peripheral crimp seal.

Research culminating in the invention disclosed herein also resulted in other inventions. These other inventions are the subject of other U.S. patents which spawned from patent applications filed on the same day of the patent application from which this U.S. patent matured. These other patent applications are U.S. patent application Ser. No. 08/206,051, "Method Of Producing Button-Type Batteries And Spring-Biased Concave Button-Type Battery", listing John R. Tuttle and Mark E. Tuttle as inventors U.S. patent application Ser. No. 08/205,590, "Methods 0f Producing Button-Type Batteries And A Plurality Of Battery Terminal Housing Members", listing Rickie Lake and Peter M. Blonsky as inventors and U.S. patent application Ser. No. 08/205,611, "Button-Type Battery With Improved Separator And Gasket Construction", listing Peter M. Blonsky and Mark E. Tuttle as inventors These co-filed patent applications and resulting patents are hereby incorporated by reference as if fully included herein.

FIGS. 3-5 show a button-type battery 40 according to a first preferred embodiment of this invention. Battery 40 has an anode 42, a cathode 44 positioned adjacent to the anode, and a liquid electrolyte 46 between the anode and cathode. Anode 42 and cathode 44 are aligned along a transverse central axis 45.

Button-type battery 40 also includes a circular conductive first, lower, or bottom terminal housing member 48 which forms the can of the energy cell. First terminal housing member 48 has a central portion 50 in electrical contact with cathode 44 and a periphery 52 surrounding central portion 50. First housing member 48 defines the positive battery terminal because it contacts cathode 44.

Battery 40 has a circular conductive second, upper, or top terminal housing member 54 which forms the lid of the energy cell. The second terminal housing member 54 has a central portion 56 in electrical contact with anode 42 and a periphery 58 surrounding central portion 56. By contacting anode 42, second housing member 52 defines the negative battery terminal. First and second terminal housing members 48 and 54 combine to form an enclosed housing 60 which holds and protects anode 42, cathode 44, and electrolyte 46. It should be noted that the first and second terminal housing members 48 and 54 can be alternately reversed to electrically contact anode 42 and cathode 44, respectively, thereby reversing their respective terminal polarities.

Anode 42, cathode 44, and electrolyte 46 can be formed of conventional construction. For example, in the reduction to practice models, anode 42 comprises elemental lithium provided on a copper backed foil. Anode 42 has a preferred thickness of approximately 2 mils (0.0508 mm). Cathode 44 is formed of a compressed tablet made from a composite of manganese (IV) oxide, carbon, and teflon powder. Cathode 44 has a preferred thickness of 8 mils (0.2032 mm).

An example electrolyte 46 comprises a solution of propylene carbonate and ethylene glycol dimethylether, having dissolved lithium tetrafluoroborate. Suitable electrolyte components are supplied by Aldrich Chemical Company of Milwaukee, Wis. The volume of electrolyte 46 provided within first terminal housing member 48 is preferably gauged to fill the substantial void within housing member 48, yet not so great to leak upon crimp sealing the battery assembly.

First and second terminal housing members 48 and 52 are preferably formed of a conductive material having a thickness of less than 8 mils (0.2032 mm), with a thickness in a range of approximately 3–5 mils (0.0762–0.1270 mm) being more preferred, and a thickness of 4 mils (0.1016 mm) being most preferred. An example material used for the terminal housing members is Type 304 stainless steel manufactured by Teledyne Rodney Metals of New Bedford, Mass.

An insulating gasket 62 is provided between first and second terminal housing member peripheries 52 and 58 to electrically insulate first terminal housing member 48 from second terminal housing member 54. Gasket 62 is preferably formed of an epoxy resin that is screen printed onto can periphery 52 of first terminal housing member 48. Gasket 62 can alternately be deposited onto all three sides 58a, 58b, 58c of lid periphery 58 of second terminal housing member 54. The gasket can be formed of one or more layers of epoxy resins, with varying degrees of hardness. An example composite gasket has a harder outer epoxy layer adjacent to battery can periphery 52 and an inner softer epoxy layer. Epoxy gasket material of different resultant hardness are available from Electronics Materials, Inc., of Brookfield, Conn. Alternately, gasket 62 can be formed of other insulative materials, such as polyimide.

First and second terminal housing member peripheries 52 and 58 and insulating gasket 62 are configured together to form a fluid-tight peripheral seal 64 which fluidically seals anode 42, cathode 44, and electrolyte 46 within housing 60. Peripheral seal 64 is preferably a C-shaped crimp seal. This crimp seal is constructed by bending can periphery 52 about lid periphery 58.

FIG. 5 shows the C-shape peripheral crimp seal 64 is more detail. Second terminal housing member periphery 58 is substantially planar within the seal and projects substantially radially outward from central axis 45 (i.e., horizontal in the drawings). First terminal housing member periphery 52 and insulating gasket 62 wrap around three sides 58a, 58b, 58c of battery lid periphery 58. First terminal housing member periphery 52 consists of two substantially planar segments 66 and 68 on respective opposing sides 58a and 58c of the substantially planar second terminal housing member 58 and a continuously bending segment 70 on side 58b of lid periphery 58. Continuously bending segment 70 connects upper segment 66 and lower segment 68 and has an example radius of curvature of 3.5 mils (0.0889 mm). Most preferably, the planar lid periphery 58 and the planar upper and lower segments 66 and 68 of can periphery 52 are all substantially in parallel.

The action associated with forming C-shape peripheral crimp seal 64 produces an indentation in circular first terminal housing member 48. This is caused by the thickness of housing member 48 and the radius of bending segment 70 being in combination effectively small to induce compressive stresses which result in such upward contraction.

Button-type battery 40 also includes a separator 72 provided between anode 42 and cathode 44. Separator 72 includes a central portion 74 which physically separates anode 42 and cathode 44 and a peripheral portion 76 surrounding central portion 74. Separator peripheral portion 76 extends between the first and second terminal housing member peripheries 52 and 58 at least partially into peripheral seal 64. More particularly, separator periphery 76 is interposed between insulating gasket 62 and lid periphery 58 to thereby partially overlap with insulating gasket 62. It should be noted that when gasket 62 is deposited onto lid periphery 58, separator periphery 76 will be interposed between insulating gasket 62 and can periphery 52.

Separator 72 is preferably formed of a woven or porous polymeric material, such as polyethylene, polypropylene, or teflon. Separator 72 has unidirectional pores formed in the Z direction parallel to central axis 45 to facilitate electrolytic conductivity between anode 42 and cathode 44. Separator 72 has a preferable thickness of 1 mil (0.0254 mm). However, separator periphery 76 is compressed during crimping into a substantially flat layer having a thickness less than 1 mil (0.0254 mm).

Button-type battery 40 of this invention is advantageous over prior art batteries in that separator 72 extends into peripheral crimped seal 64 to ensure complete separation between anode 42 and cathode 44. Additionally, button-type battery 40 has a very thin profile due to the reduced material thicknesses as well as the C-shaped crimp seal 64.

Anode 43, cathode 44, electrolyte 46, terminal housing members 48 and 54, insulating gasket 62, and separator 72 form an integral button-type energy cell unit 80. Energy cell unit 80 has a composite first portion 82 and a composite second portion 84 intermediate of peripheral seal 64. Button-type battery 40, by virtue of its thin profile in combination with its leak resistant C-shaped crimp peripheral seal 64, is capable of being deflected such that first portion 82 is angled relative to second portion 84 without destroying operation of the button-type battery or rupturing the fluid-tight peripheral crimp seal 64.

Figure 7:
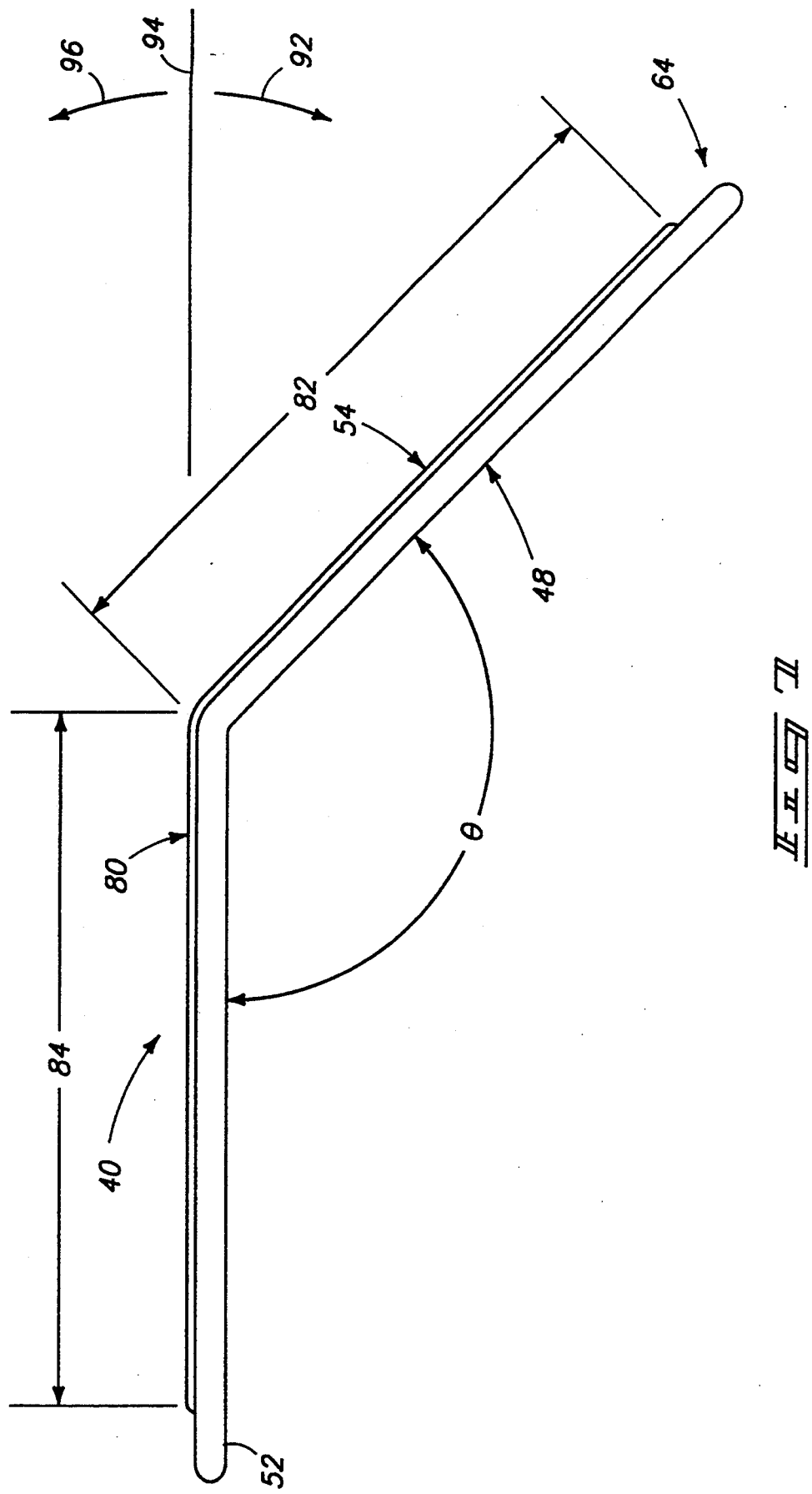
FIG. 7 is a side view of the FIG. 3 button-type battery where a portion of the battery is angled relative to another portion of the battery.

FIGS. 7 and 8 illustrate the bendable button-type battery 40 of this invention. Internal angle $\theta$ is defined between first portion 82 and second portion 84 of battery energy cell 80. According to this invention, first portion 82 can be angled relative to second portion 84 over a wide range of angles $\theta$. Preferably, internal angle $\theta$ is in a range from 175° to at least 90°. That is, the first portion can be bent from its horizontal position at plane 94 (i.e., where internal angle $\theta$ is 180°) through a −45° arc from horizontal plane 94 (thereby defining an internal angle $\theta$ of 135°), to a perpendicular position (defining an internal angle $\theta$ of 90°). It has been shown in experiments that button-type battery 40 can be bent 90° without destroying operation of the energy cell or rupturing the fluid-tight primary crimp seal. Test data supporting this finding is discussed below.

FIGS. 7 and 8 illustrate button-type battery 40 being bent in a downward arc 92 from horizontal plane 94. It should be understood that button-type battery 40 can be bent in an upward arc 96 from horizontal plane 94 with similar success. Internal angle $\theta$ would again be the angle between first portion 82 and second portion 84.

The flexibility of button-type batteries of this invention is achieved by a combination of the thin profile of the battery and the peripheral crimp seal 64. The thickness of energy cell unit 80 (i.e., the total combined thicknesses of anode 42, cathode 44, separator 72, and the first and second terminal housing members 48 and 54) is less than 1 mm, and is most preferably approximately 0.5 mm or less. Peripheral crimp seal 64 has an effective seal integrity that resists leakage of the electrolyte, while facilitating the thin profile of battery 40.

In this manner, the energy cell unit 80 has an effective thickness and the C-shaped peripheral crimp seal 64 has an effective seal integrity to permit flexibility of button-type battery 40 where first portion 82 can be deflected relative to second portion 84 without destroying operation of the button-type battery or rupturing the fluid-tight peripheral crimp seal.

Comparative deflection analysis was conducted on the button-type battery 40 of this invention and conventional button-type batteries. In two analyses described herein, a battery manufactured by Renata SA of Itingen, Switzerland, was used as a representative conventional button-type battery. In these two comparative analyses, a 2005 battery and a 1605 battery constructed according to this invention were examined against a 2016 battery and a 1620 battery, respectively, manufactured by Renata ™. The notation "2005" is standard and well understood in the battery industry. The first two digits "20" represent the battery diameter in millimeters (i.e., "20" means 20 mm) and the second two digits "05" represent a thickness of the battery cell in tenths of millimeters (i.e., "05" means 0.5 mm). Accordingly, a 2005 button-type battery has a 20 mm diameter and a 0.5 mm thickness and a 1605 button-type battery has a 16 mm diameter and a 0.5 mm thickness). The 2016 Renata ™ battery has a 20 mm diameter and a 1.6 mm thickness and the 1620 Renata ™ battery has a 16 mm diameter and a 2.0 mm thickness.

The data from these comparative tests are found in Tables I and II below. The data collected during the comparative analysis was derived according to the following procedure. Each battery was clamped in a vise grip along its center maximum diameter and deflected about the diameter (as illustrated in FIG. 7). A traveler measurement device was inverted and placed against the bottom can or first terminal housing member near the edge of the battery. Pressure was then applied on the opposing side of the battery against the traveler. The traveler measured defection, with a sensitivity of ±1 mil (i.e., 0.001 inches or 0.0254 mm). Pressure was then released at the desired deflection amounts and the battery cell was observed. Any noticeable rupturing of the cell seal was noted and any residual bend following deflection was measured.

The following Tables I and II show the amount deflected in mils, followed by respective columns of the two batteries being compared which show residual bends, also in mils. The point of deflection at which the Renata TM cell ruptured and the electrolyte material leaked out is identified in the tables.

Table I compares the 2016 Renata TM battery with a 2005 button-type battery of this invention.

TABLE I

| Deflection (mils) | Residual Bend (mils) | |
|---|---|---|
| | 2016 Renata TM | 2005 Invention |
| 1 | 0.1 | 0 |
| 2 | 0.3 | 0 |
| 3 | 0.5 | 0.1 |
| 4 | 1.0 | 0.4 |
| 5 | 1.1 | 0.5 |
| 6 | 1.1 | 0.6 |
| 7 | 1.2 | 0.6 |
| 8 | 1.3 | 0.6 |
| 9 | Ruptured 1.7 | 0.8 |
| 10 | 2.0 | 1.0 |
| 11 | 2.2 | 1.2 |
| 12 | 2.5 | 1.2 |
| 13 | 2.7 | 1.3 |
| 14 | 3.0 | 1.4 |
| 15 | 3.3 | 1.5 |
| 16 | 3.8 | 1.8 |
| 17 | 4.2 | 2.0 |
| 18 | 5.0 | 2.1 |
| 19 | 6.0 | 2.3 |
| 20 | 6.4 | 2.5 |
| 25 | 8.3 | 3.1 |
| 30 | 10.2 | 4.0 |

Table II compares the 1620 Renata TM Battery with a 1605 button-type battery of this invention.

TABLE II

| Deflection (mils) | Residual Bend (mils) | |
|---|---|---|
| | 1620 Renata TM | 1605 Invention |
| 1 | 0.1 | 0 |
| 2 | 0.3 | 0 |
| 3 | 0.5 | 0 |
| 4 | 0.9 | 0.1 |
| 5 | 1.0 | 0.3 |
| 6 | 1.1 | 0.6 |
| 7 | 1.3 | 1.0 |
| 8 | 1.6 | 1.1 |
| 9 | 1.9 | 1.3 |
| 10 | 2.0 | 1.3 |
| 11 | 2.2 | 1.5 |
| 12 | 2.8 | 1.8 |
| 13 | 3.0 | 2.2 |
| 14 | 3.3 | 2.4 |
| 15 | 3.8 | 2.9 |
| 16 | 4.8 | 3.1 |
| 17 | 5.3 | 3.3 |
| 18 | Ruptured 6.0 | 3.5 |
| 19 | 6.4 | 3.8 |
| 20 | 6.8 | 4.3 |
| 25 | 9.0 | 6.0 |
| 30 | 12.4 | 8.2 |

As evident from the data in Tables I and II, it was observed that the Renata TM 2016 battery ruptured and began to leak electrolyte following a deflection of 9 mils. For a battery diameter of 20 mm which is bent along the center diameter (in a similar fashion as shown in FIG. 7), the Renata TM 2016 battery ruptured at an angular deflection of 1.3°; or said another way, the internal angle $\theta$ between the two bend portions of the Renata TM battery was only 178.7° at rupture.

The Renata TM 1620 ruptured at a deflection of 18 mils. For a battery having a diameter of 16 mm, this means the Renata TM 1620 ruptured at an angular deflection about its center of 3.3°; or said another way, the internal angle $\theta$ between the two angled portions was merely 176.7° at rupture.

In a third analysis, a button-type battery sold under the mark Eveready TM was used as a representative conventional button-type battery. The analysis examined a 2005 battery of this invention against a 2012 Eveready TM battery (i.e., having a 20 mm diameter and a 1.2 mm thickness). The same procedure as that described above was used to conduct the comparison. Table III contains the results.

TABLE III

| Deflection (mils) | Residual Bend (mils) | |
|---|---|---|
| | 2012 Eveready TM | 2005 Invention |
| 1 | 0 | 0 |
| 2 | 0.3 | 0 |
| 3 | 0.7 | 0.1 |
| 4 | 1.0 | 0.4 |
| 5 | 1.1 | 0.5 |
| 6 | 1.3 | 0.6 |
| 7 | 1.8 | 0.6 |
| 8 | 1.9 | 0.6 |
| 9 | 2.1 | 0.8 |
| 10 | 2.3 | 1.0 |
| 11 | 2.8 | 1.2 |
| 12 | 3.1 | 1.2 |
| 13 | 3.5 | 1.3 |
| 14 | 4.0 | 1.4 |
| 15 | 4.2 | 1.5 |
| 16 | 4.8 | 1.8 |
| 17 | 5.1 | 2.0 |
| 18 | 5.9 | 2.1 |
| 19 | Ruptured 6.1 | 2.3 |
| 20 | 6.9 | 2.5 |
| 25 | 8.3 | 3.1 |
| 30 | 9.5 | 4.0 |

As evident from the data in Table III, the Eveready TM 2012 battery ruptured and began to leak electrolyte following a deflection of 19 mils (0.4826 mm). The Eveready TM 2012 battery ruptured at an angular deflection of 2.8°; or the internal angle $\theta$ between the two bend portions of the Eveready TM battery was only 177.2° at rupture.

It is clear from these results that conventional button-type batteries are incapable of being angled while still remaining operational. Again, the Renata TM and Toshiba TM batteries are considered to be representative of conventional button-type batteries. The 2005 and 1605 batteries of this invention are the thinnest button-type batteries known to be in existence at the time this document was drafted. The 2016 and 1620 Renata TM batteries represent thin button-type batteries, with the 2012 Eveready TM battery representing the thinnest button-type battery, that were commercially available. It should be noted that similar tests and results were also achieved in comparative analysis with Toshiba TM button-type batteries.

In striking contrast to conventional button-type batteries, the button-type battery of this invention did not rupture throughout the comparative analyses. The battery was further bent beyond the 30 mils indicated in Tables I, II, and III until the first portion 82 was essentially perpendicular to the second portion 84, resulting in an internal angle θ of 90°. At this perpendicular arrangement, the battery cell was still fully operational and the C-shape crimp seal had not ruptured. The cell was then bent beyond perpendicular so that the internal angle θ was less than 90°. The battery remained fully operational until an internal angle θ of approximately 40°, at which time the cell shorted and stopped working. It is believed that a cell constructed with the slightly increased rim separation shown in FIG. 6 can be bent beyond an internal angle θ of 40° without destroying battery operation or rupturing the seal.

Figure 6:
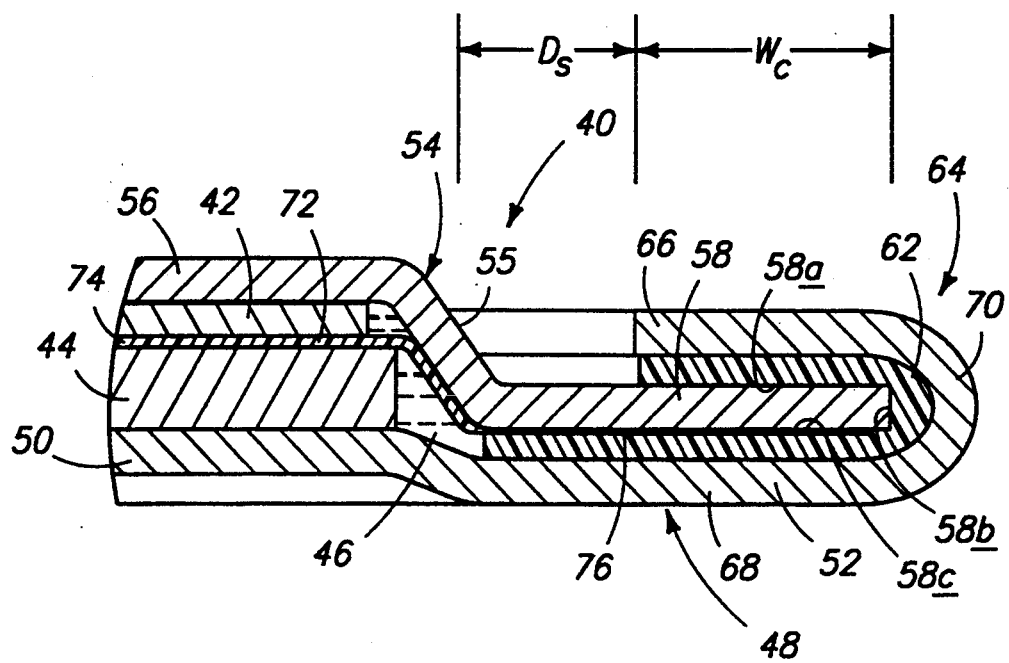
FIG. 6 is an enlarged cross-sectional view similar to that taken in circle 5 of FIG. 4 and shows a modified C-shaped fluid-tight crimp seal according to another aspect of this invention.

FIG. 6 shows a modified crimp seal section wherein seal 64 is radially spaced farther from upper terminal housing member 54. The separation distance $D_S$ between the radially inward edge of segment 66 of first terminal housing member 48 and sloping portion 55 of second terminal housing member 54 is increased to preferably approximately 3 mils (0.0762 mm). By comparison, the width $W_C$ of the overlapping members 66, 68 and periphery 58 within crimp seal 64 is approximately 7 mils (0.1778 ram). The FIG. 6 modification reduces or effectively eliminates any tendency of the inward edge of segment 66 to contact second terminal housing member 54 during deflection and thereby electrically short the two terminal housing members together. 0f course, another modification for assuring good electrical insulation between housing members 48 and 54 during flexing is to have insulating gasket material 62 exteriorly extend beyond crimp seal 64 and past segment 66, projecting partially up sloping portion 55 of first terminal housing member 54.

Apart from deflection, another appreciable difference between the button-type battery of this invention and conventional button-type batteries concerns the amount of force required to effectuate the bend. Comparatively little force was used to angle the button-type batteries of this invention, whereas comparatively greater force was required to angle the Renata ™ and Eveready ™ batteries. Table IV lists the amount of force (in kg, where 1 kg=2.2 lbs) applied to each of the five button-type batteries to achieve a deflection of 10 mils.

TABLE IV

| Force Applied to Cause a Deflection of 10 mils | | | | |
| --- | --- | --- | --- | --- |
| 2005 Invention | 2012 Eveready ™ | 2016 Renata ™ | 1605 Invention | 1620 Renata ™ |
| <0.2 kg | 1.8 kg | 3.4 kg | 0.3 kg | >6.0 kg |

The bendable button-type battery 40 of this invention is advantageous for two reasons. First, it is very thin. At 0.5 mm, the battery 40 of this invention is over twice as thin in comparison to presently commercial button-type batteries which have a minimum thickness of 1.2 mm. This thin profile is advantageous for application in thin integrated circuit cards. Credit cards and the like have a nominal thickness requirement of 30 mils (0.762 mm). The 0.5 mm button-type battery of this invention satisfies this requirement for credit cards, whereas the present commercial button-type batteries at 1.2 mm are too thick.

The second advantage is that the bendable button-type battery of this invention is ideal for use in credit cards or smart cards which have certain flexibility requirements. Once installed in a credit card, button-type battery 40 can be flexed with the credit card without danger of becoming inoperable. Prior art button-type batteries have essentially no flexibility and rupture immediately when even slightly bent.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A button cell comprising:
   an anode;
   a cathode positioned adjacent to the anode;
   a separator between and separating the anode and the cathode;
   an electrolyte between the anode and cathode;
   a conductive first terminal housing member in electrical contact with one of the anode or the cathode; the first terminal housing member having a periphery;
   a conductive second terminal housing member in electrical contact with the other of the anode or the cathode; the second terminal housing member having a periphery;
   the first and second terminal housing members forming an enclosed housing which holds and protects the anode and the cathode;
   an insulating gasket between the first and second terminal housing member peripheries to electrically insulate the first terminal housing member from the second terminal housing member; and
   the first and second terminal housing member peripheries and the insulating gasket being configured together to form a fluid-tight peripheral seal which seals the anode, cathode, separator, and electrolyte within the housing formed by the first and second terminal housing members;
   the button cell unit having composite first and second portions intermediate of the peripheral seal, the first portion being angled relative to the second portion to define an internal angle between the first and second portions, the internal angle being in a range from 175° to 90°.

2. A button cell according to claim 1 wherein the internal angle between the first and second portions is in a range from 135° to 90°.

3. A button cell according to claim 1 wherein the internal angle between the first and second portions is approximately 90°.

4. A button cell according to claim 1 wherein the internal angle between the first and second portions is less than 90°.

5. A button cell according to claim 1 wherein the anode, cathode, separator, and first and second terminal housing members have a total combined thickness of less than 1 millimeter.

6. A button cell according to claim 1 wherein the anode, cathode, separator, and first and second terminal housing members have a total combined thickness of approximately 0.5 millimeter or less.

7. A button cell according to claim 1 wherein:
   the anode and cathode are aligned along a transverse central axis;
   the second terminal housing member periphery is substantially planar and projects substantially radially outward from the central axis;

the first terminal housing member periphery and the insulating gasket wrap around three sides of the second terminal housing member periphery, the first terminal housing member periphery having two substantially planar segments on opposing sides of the substantially planar second terminal housing member periphery and a continuously bending segment on a third side of the second terminal housing member periphery connecting the two substantially planar segments.

8. A button cell according to claim 7 wherein the substantially planar second terminal housing member periphery and the two substantially planar segments of the first terminal housing member periphery are all substantially in parallel.

9. A button cell comprising:
an integral unit having an anode, a cathode, a separator, and an electrolyte encased within a housing, the housing having a fluid-tight peripheral seal; and
the integral unit having first and second portions intermediate of the peripheral seal, the first portion being deflectable relative to the second portion through an internal angle between the first and second portions in a range from 175° to 90° without destroying operation of the button cell or rupturing the fluid-tight peripheral seal.

10. A button cell according to claim 9 wherein the internal angle between the first and second portions is in a range from 135° to 90°.

11. A button cell according to claim 9 wherein the internal angle between the first and second portions is approximately 90°.

12. A button cell according to claim 9 wherein the internal angle between the first and second portions is less than 90°.

13. A button cell according to claim 9 wherein the anode, cathode, separator, and housing have a total combined thickness of less than 1 millimeter.

14. A button cell according to claim 9 wherein the anode, cathode, separator, and housing have a total combined thickness of approximately 0.5 millimeter or less.

15. A button cell comprising:
an anode aligned along a transverse central axis;
a cathode positioned adjacent to the anode and aligned along the transverse central axis;
a separator between and separating the anode and the cathode;
an electrolyte between the anode and the cathode;
a conductive first terminal housing member in electrical contact with one of the anode or the cathode; the first terminal housing member having a periphery;
a conductive second terminal housing member in electrical contact with the other of the anode or the cathode; the second terminal housing member having a periphery projecting substantially radially outward from the central axis;
the first and second terminal housing members forming an enclosed housing which holds and protects the anode and the cathode;
an insulating gasket between the first and second terminal housing member peripheries to electrically insulate the first terminal housing member from the second terminal housing member;
the first terminal housing member periphery and the insulating gasket wrapping around three sides of the second terminal housing member periphery to form a fluid-tight peripheral crimp seal which fluidically seals the anode and the cathode within the housing formed by the first and second terminal housing members, the first terminal housing member periphery having two segments on opposing sides of the second terminal housing member periphery and a continuously bending segment on a third side of the second terminal housing member periphery connecting the two segments; and
the anode, the cathode, the separator, and the first and second terminal housing members having an effective total combined thickness and the peripheral crimp seal having an effective seal integrity to permit flexibility of the button cell where one portion of the button cell intermediate of the peripheral crimp seal can be deflected relative to another portion of the button cell intermediate of the peripheral crimp seal through an internal angle between the two portions in a range of 175° to 90° without destroying operation of the button cell or rupturing the fluid-tight peripheral crimp seal.

16. A button cell according to claim 15 wherein the anode, cathode, separator, and first and second terminal housing members have a total combined thickness of less than 1 millimeter.

17. A button cell according to claim 15 wherein the anode, cathode, separator, and first and second terminal housing members have a total combined thickness of approximately 0.5 millimeter or less.

18. A button cell according to claim 15 wherein the first and second terminal housing members are formed of a stainless steel having thickness of less than 8 mils.

19. A button cell according to claim 15 wherein the first and second terminal housing members are formed of a stainless steel having thickness in a range of approximately 3–5 mils.

20. A button cell according to claim 15 wherein the fluid-tight seal is C-shaped.

21. A button cell according to claim 15 wherein:
the two segments of the first terminal housing member periphery are substantially planar;
the second terminal housing member periphery is substantially planar; and
the substantially planar second terminal housing member periphery and the two substantially planar segments of the first terminal housing member periphery are all substantially in parallel.

* * * * *